Figure 1:
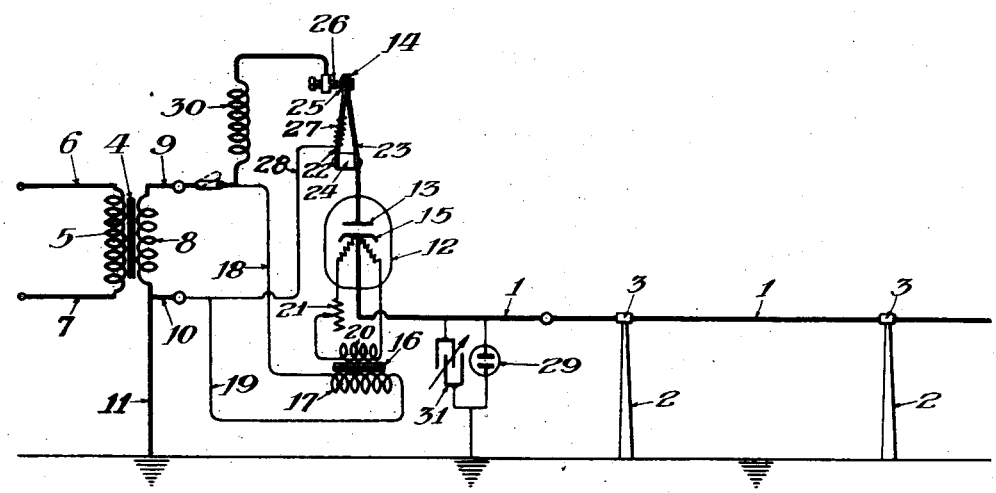

May 11, 1943.  J. ROACH  2,318,832
ELECTRIC FENCE
Filed April 9, 1937

Inventor:
John Roach
By: [signature]
Attorney.

Patented May 11, 1943

2,318,832

UNITED STATES PATENT OFFICE 2,318,832

ELECTRIC FENCE

John Roach, Milwaukee, Wis., assignor of one-half to Edwin B. H. Tower, Jr., Milwaukee, Wis.

Application April 9, 1937, Serial No. 135,867

16 Claims. (Cl. 256—10)

The invention relates to an electric fence of the type in which a fence conductor is arranged to form a fence to bound a field and insulated from the ground or other return conductor to form an open fence circuit.

The fence conductor and the return conductor are connected to an electric energy source, and the electric energy delivered to the fence circuit is controlled by an electric controller arranged between the electric energy source and the fence circuit.

When an animal makes contact with the fence conductor and closes the fence circuit from the fence conductor to the ground, it will receive an electric shock.

Once an animal has made contact with the fence conductor and received an effective electric shock, it will ordinarily seek to avoid again making contact with the fence conductor.

The electric controller that has heretofore been employed in most instances is provided with a fixed ohmic resistance arranged in series with the fence conductor to limit the electric energy to give an electric shock to an animal.

But a fixed ohmic resistance lacks ability to maintain the electric energy within the required range under the variable conditions in practice, as the ultimate factor that limits the electric energy delivered through the fixed ohmic resistance is the external resistance interposed in the fence circuit by an animal in contact with the fence conductor and the return conductor.

If the fixed resistance is adjusted to control the electric energy to protect an animal or person interposing a low external resistance in the fence circuit from an excessive or injurious electric shock, the electric energy deliverable through the fence circuit may be insufficient to give an effective electric shock to an animal interposing a high external resistance in the fence circuit.

If the fixed resistance is adjusted to control the electric energy to give an effective electric shock to an animal interposing a high external resistance in the fence circuit, the electric energy deliverable through the fence circuit may give an excessive or injurious electric shock to an animal or person interposing a low external resistance in the fence circuit.

The present invention has for its object to provide an electric fence with an electric controller which will control the electric energy to give an animal an effective electric shock, but which will impose a sufficient limitation upon the electric energy to protect an animal or person from an excessive or injurious electric shock.

Another object is to provide an electric fence with an electric controller which will impose a sufficient limitation upon the electric energy to protect an animal or person from an excessive electric shock, but which will momentarily deliver sufficient electric energy to insure giving an animal an effective electric shock.

Another object is to provide a simple and effective electric fence controller.

Another object is to provide an electric fence controller which may be readily and economically manufactured.

According to the present invention as it is ordinarily embodied in practice, an electronic tube is employed to rectify and control electric enrgy delivered by an electric energy source, a condenser is connected in a closed charging circuit to the electric energy source in series with the electronic tube to store electric energy from the electric energy source, and a fence wire and a return conductor forming an open fence circuit are connected to the condenser to deliver electric energy therefrom to give an electric shock to an animal making contact with the fence conductor and the return conductor.

As the invention is viewed from another aspect, a condenser is connected to a fence wire and a return conductor forming an open fence circuit, and an electric energy source is connected to the condenser in a closed circuit to deliver electric energy to charge the condenser so long as the fence circuit is open.

When an animal makes contact with the fence wire and the return conductor and thereby closes the fence circuit, the condenser discharges its stored electric energy through the fence circuit to instigate an electric shock to the animal.

The electric fence illustrated in the accompanying drawing and hereinafter described exemplifies the invention.

The single figure of the drawing is a diagrammatic representation of the fence and the appliances employed therein.

The electric fence is provided with a fence or contact conductor 1 arranged on fence posts 2 to bound or inclose a field or pasture and insulated from the ground or other return conductor by insulators 3 to form an open fence circuit.

The fence conductor is energized by electric energy delivered thereto through a supply circuit from a transformer 4.

The transformer has its primary winding 5 connected by power conductors 6 and 7 to an alternating current source and its secondary winding 8 connected by supply conductors 9 and 10 and a ground conductor 11.

The electric fence is provided with an electric energy controller in which is an electronic tube 12 of the thermionic type having an anode 13 connected to an automatic circuit interrupter 14 and a heated cathode 15 connected to the fence conductor 1.

The thermionic tube controls the electric energy delivered to the fence conductor and thereby limits the electric energy deliverable from the fence conductor upon closure of the fence circuit.

The heated cathode is energized by electric energy from a heating transformer 16 having its primary winding 17 connected to the supply circuit by conductors 18 and 19 and its secondary winding 20 connected to the heated cathode.

A variable resistance 21 is arranged in circuit with the heated cathode to control its energizing current and adjust its temperature.

The circuit interrupter 14 is provided with a thermostatic switch formed by two resilient blades 22 and 23 joined to each other at one end and attached to a fixed support 24 at the other end.

The switch blades carry a movable contact 25 engaging a stationary contact 26 to connect the thermionic tube to the supply circuit.

The thermostatic switch is actuated by an electric heater 27 arranged on the switch blade 22 and connected to the supply circuit by a conductor 28 and the switch contacts 25 and 26.

A gaseous signal lamp 29, such as a neon lamp, is arranged across the fence circuit between the fence conductor and the ground to indicate that the fence conductor is energized and the electric fence is in operation.

The electric fence may be provided with an inductive impedance 30 connected in the supply circuit in series with the thermionic tube and a variable condenser 31 connected across the fence circuit in parallel with the signal lamp.

The impedance and the condenser serve to keep the fluctuations in the electric energy upon the supply circuit and the fence circuit from interfering with a radio receiver in the vicinity of the electric fence.

The condenser 31 is connected in circuit in series with the thermionic tube 12 and across the fence circuit so as to be charged by electric energy delivered from the transformer through the thermionic tube.

The thermionic tube serves to rectify the alternating current from the transformer into unidirectional pulsating current to charge the condenser.

A manual switch is arranged in the supply circuit to connect the fence circuit thereto and thereby place the electric fence in operation.

The control appliances are combined in practice into a unitary electric fence controller provided with terminals to connect the supply conductors and the fence conductor thereto.

When the fence is in operation and an animal makes contact with the fence conductor and closes the fence circuit between the fence conductor and the ground, current is delivered from the transformer through supply conductor 9, impedance 30, circuit interrupter 14, thermionic tube 12, and fence conductor 1 to the animal, and thence through the animal to the ground or other return conductor back to the transformer.

The condenser serves to augment the electric energy delivered from the transformer through the thermionic tube to give the animal an electric shock.

So long as the condenser is charged to its approximate capacity, sufficient electric energy is always available, even during the interim between the pulsations in the electric energy from the transformer, to instigate an effective electric shock to the animal.

When the condenser has delivered its charge, the thermionic tube limits the electric energy delivered from the transformer to the fence circuit until the animal retracts itself from the fence conductor.

The circuit interrupter is actuated by its electric heater to cause periodic interruptions in the electric energy delivered to the fence conductor.

The signal lamp flashes upon closure of the circuit interrupter and thereby gives a more definite signal to indicate that the fence conductor is energized and the electric fence is in operation.

The thermionic tube controls the electric energy delivered to the fence conductor to maintain a sufficient voltage to deliver ample current to give an effective electric shock to an animal interposing a high external resistance in the fence circuit.

The thermionic tube is itself controlled by its heated cathode to control the electric energy delivered to the fence conductor to impose a predetermined limitation upon the current deliverable from the fence conductor to an animal in contact therewith and thereby protect an animal or person in contact with the fence conductor from an excessive or injurious electric shock.

The heated cathode may have its temperature adjusted by the adjustable resistance 21 to vary and adjust the predetermined limitation imposed upon the current delivered to the fence conductor and thence to an animal in contact therewith.

According to the conditions obtaining under some conditions in practice, the transformer delivers to the supply conductors a sixty-cycle 120-volt alternating current, and the thermionic tube controls the electric energy delivered to the fence conductor to impress about 75 volts across the open fence circuit and limit the current deliverable from the fence conductor to under fifty (50) milliamperes.

The thermionic tube may have its characteristics modified and the temperature of its cathode adjusted to control the electric energy delivered to the fence conductor to maintain different voltages across the open fence circuit and impose different limitations upon the current deliverable from the fence conductor to an animal or person in contact therewith.

The circuit interrupter is adjustable to vary the time the fence conductor is energized and the time it is deenergized.

The invention may be embodied in various different ways which will be within its scope as defined by the hereinafter claims.

The invention shown in the accompanying drawing and described in the foregoing specification is hereby defined and claimed as follows:

1. An electric fence, comprising the combination with a fence conductor arranged to form a fence to bound a field and insulated from a return conductor to form an open fence circuit and an electric energy source to deliver electric energy to said fence circuit to give an electric shock to an animal making contact with said fence conductor and said return conductor, of means to control said electric energy to deliver sufficient current to give an effective electric shock to an animal possessing a high resistance and impose a predetermined limitation upon said current to protect an animal from an excessive electric shock independent of the external resistance interposed in said fence circuit, and a condenser connected across said fence circuit between said fence conductor and said return conductor to augment the voltage across said fence circuit to instigate an electric shock to an animal.

2. An electric fence, comprising the combination with a fence conductor arranged to form a fence to bound a field and insulated from a return conductor to form an open fence circuit and an electric energy source to deliver electric energy to said fence circuit to give an electric shock to an animal making contact with said fence conductor and said return conductor, of an electronic tube arranged to control said electric energy and adjusted to deliver sufficient current to said fence circuit to give an effective electric shock to an animal and impose a predetermined limitation upon said current independent of the external resistance interposed in said fence circuit, and a condenser connected across said fence circuit between said fence conductor and said return conductor to augment the voltage across said fence circuit upon an animal making contact with said fence conductor and said return conductor.

3. An electric fence, comprising the combination with a fence conductor arranged to form a fence to bound a field and insulated from a return conductor to form an open fence circuit and an electric energy source to deliver electric energy to said fence circuit to give an electric shock to an animal making contact with said fence conductor and said return conductor, of storing means connected in circuit in series with said electric energy source and across said fence circuit to store electric energy from said electric energy source and to discharge said stored electric energy through said fence circuit to augment the voltage to give an electric shock to an animal making contact with said fence conductor and said return conductor, and means connected in circuit in series with said fence conductor and said electric energy source to limit the electric energy delivered to said fence circuit by said electric energy source.

4. An electric fence, comprising the combination with a fence conductor arranged to form a fence to bound a field and insulated from a return conductor to form an open fence circuit and an electric energy source to deliver electric energy to said fence circuit to give an electric shock to an animal making contact with said fence conductor and said return conductor, of storing means connected in circuit in series with said electric energy source and across said fence circuit to store electric energy from said electric energy source and to discharge said stored electric energy through said fence circuit to augment the voltage to give an electric shock to an animal making contact with said fence conductor and said return conductor, and means connected in circuit in series with said fence conductor and said electric energy source to limit the electric energy delivered to said fence circuit by said electric energy source independent of the external resistance interposed in said fence circuit by an animal.

5. In combination with a fence wire adapted to be electrically grounded through the body of an animal contacting the same, a current supply, means connected with the wire and adapted to store up a high value electrical charge which is adapted to be spontaneously discharged and spent upon grounding of the wire through the body of an animal in contact with the wire, and means limiting the current supply to the wire during the grounding thereof.

6. In combination with a fence wire adapted to be electrically grounded through the body of an animal contacting the same, means connected with the wire to store up a substantial electrical charge which is adapted to be released and spent spontaneously upon grounding of the wire to give an animal grounding the same a short sudden and effective shock, and means for building up an electrical charge in said last named means.

7. In an apparatus for charging a fence wire with high voltage electricity, the combination of a source of direct current, a condenser in which the voltage is adapted to be built up and stored, a fence wire properly insulated from the ground and connected to one side of the condenser, said fence wire being adapted to discharge the charge stored in the condenser to the ground through any animal that comes in contact with the fence wire.

8. An electric fence, comprising the combination with an electric energy source possessing capacity to deliver electric energy of an order to give an injurious electric shock to an animal or person, of a fence conductor arranged to form a fence to bound a field and insulated from a return conductor to form an open fence circuit, conductive means arranged in circuit in series with said electric energy source and said fence conductor to modify electric energy from said source to protect an animal or person in contact with said fence conductor and said return conductor from an injurious electric shock, and storing means connected in circuit in series with said conductive means and said electric energy source and across said fence circuit to store electric energy from said electric energy source and discharge said stored electric energy through said fence conductor to an animal making contact with said fence conductor and said return conductor.

9. An electric fence, comprising the combination with an electric energy source possessing capacity to deliver electric energy of an order to give an injurious electric shock to an animal or person, of a fence conductor arranged to form a fence to bound a field and insulated from a return conductor to form an open fence circuit, an electronic tube arranged in circuit in series with said electric energy source and said fence conductor to modify electric energy from said electric energy source to protect an animal or person in contact with said fence conductor and said return conductor from an injurious electric shock, and a condenser connected in circuit in series with said electronic tube and said electric energy source and across said fence circuit to store electric energy from said electric energy source and discharge said stored electric energy through said fence conductor to an animal making contact with said fence conductor and said return conductor.

10. An electric fence, comprising the combination with an alternating current electric energy source possessing capacity to deliver electric energy of an order to give an injurious electric shock to an animal or person, of a fence conductor arranged to form a fence to bound a field and insulated from a return conductor to form an open fence circuit, an electronic rectifying tube arranged in circuit with said electric energy source and said fence conductor to rectify electric energy from said electric energy source and modify electric energy from said electric energy source to protect an animal or person from an injurious electric shock, and a condenser connected in circuit in series with said electronic tube and said electric energy source and across said fence circuit to store electric energy from said electric energy source and discharge said stored electric energy through said fence conductor to an animal making contact with said fence conductor and said return conductor.

11. An electric fence, comprising the combination with an electric energy source possessing capacity to deliver electric energy of an order to give an injurious electric shock to an animal or person, of a fence conductor arranged to form a fence to bound a field and insulated from a return conductor to form an open fence circuit, an electronic tube arranged in circuit in series with said electric energy source and said fence conductor to control electric energy from said electric energy source to deliver sufficient electric energy through said fence conductor to give an effective electric shock to an animal interposing a high resistance in said fence circuit and to impose a sufficient limitation upon said electric energy to prohibit an excessive electric shock to an animal interposing a low resistance in said fence circuit, and a condenser connected in circuit in series with said electronic tube and said electric energy source and across said fence circuit to store electric energy from said electric energy source and discharge said stored electric energy through said fence conductor to an animal making contact with said fence conductor and said return conductor.

12. An electric fence, comprising the combination with an alternating current electric energy source possessing capacity to deliver electric energy of an order to give an injurious electric shock to an animal or person, of a fence conductor arranged to form a fence to bound a field and insulated from a return conductor to form an open fence circuit, a thermionic tube arranged in circuit in series with said electric energy source and said fence conductor to rectify alternating current from said electric energy source and control electric energy from said electric energy source to deliver sufficient electric energy through said fence conductor to give an effective electric shock to an animal interposing a high resistance in said fence circuit and to impose a sufficient limitation upon said electric energy to prohibit an excessive electric shock to an animal interposing a low resistance in said fence circuit, and a condenser connected in circuit in series with said thermionic tube and said electric energy source and across said fence circuit to store electric energy from said electric energy source and discharge said stored electric energy through said fence conductor to an animal making contact with said fence conductor and said return conductor.

13. An electric fence, comprising the combination with a fence conductor arranged to form a fence to bound a field and insulated from a return conductor to form an open fence circuit and an electric energy source to deliver electric energy to said fence circuit, of an electronic tube arranged in circuit in series with said electric energy source to receive from said electric energy source electric energy of an order to give an injurious electric shock to an animal or person and controlling said electric energy to maintain sufficient electric energy to give an effective electric shock to an animal in contact with said fence conductor and said return conductor and impose a sufficient limitation upon said electric energy to protect an animal or person from an injurious electric shock independent of wide variations in the resistance interposed in the fence circuit by the animal, and a condenser connected in circuit in series with said electronic tube and said electric energy source and across said fence circuit to store electric energy from said electric energy source and discharge said stored electric energy through said fence conductor to an animal making contact with said fence conductor and said return conductor.

14. An electric fence, comprising the combination with a fence conductor arranged to form a fence to bound a field and insulated from a return conductor to form an open fence circuit, of a condenser connected to said fence circuit to deliver electric energy thereto upon an animal making contact with said fence conductor and said return conductor, an electric energy source having said condenser connected thereto in a closed circuit and delivering electric energy to said condenser through said closed circuit to charge said condenser, and means connected in series with said fence conductor to impose a sufficient limitation upon the electric energy delivered to said fence circuit to protect an animal or person from an excessive electric shock.

15. An electric fence, comprising the combination with a fence conductor arranged to form a fence to bound a field and insulated from a return conductor to form an open fence circuit, of a condenser connected to said fence circuit to deliver electric energy thereto upon an animal making contact with said fence conductor and said return conductor, an alternating current source having said condenser connected thereto in a closed circuit and delivering electric energy to said condenser through said closed circuit to charge said condenser, and means connected in said closed circuit to rectify said alternating current into unidirectional current to charge said condenser.

16. An electric fence, comprising the combination with a fence conductor arranged to form a fence to bound a field and insulated from a return conductor to form an open fence circuit, of a condenser connected to said fence circuit to deliver electric energy thereto upon an animal making contact with said fence conductor and said return conductor, an alternating current source having said condenser connected thereto in a closed circuit and delivering electric energy to said condenser through said closed circuit to charge said condenser, and a thermionic tube connected in said closed circuit to rectify said alternating current into unidirectional current to charge said condenser.

JOHN ROACH.